(12) United States Patent  (10) Patent No.: US 7,997,744 B2
Rothenbury  (45) Date of Patent: Aug. 16, 2011

(54) ELECTRICALLY CONDUCTIVE PROTECTION LAYER AND A MICROELECTROMECHANICAL DEVICE USING THE SAME

(75) Inventor: David Rothenbury, Cedar Park, TX (US)

(73) Assignee: Texas Instruments Incorporated, Dallas, TX (US)

( * ) Notice: Subject to any disclaimer, the term of this patent is extended or adjusted under 35 U.S.C. 154(b) by 723 days.

(21) Appl. No.: 12/046,588

(22) Filed: Mar. 12, 2008

(65) Prior Publication Data

US 2009/0231672 A1    Sep. 17, 2009

(51) Int. Cl.
G02B 5/08 (2006.01)
(52) U.S. Cl. ........................................................ 359/849
(58) Field of Classification Search ................... 359/290, 359/291, 295, 302, 849
See application file for complete search history.

(56) References Cited

U.S. PATENT DOCUMENTS

| | | |
|---|---|---|
| 4,662,746 A | 5/1987 | Hornbeck |
| 4,710,732 A | 12/1987 | Hornbeck |
| 5,061,049 A | 10/1991 | Hornbeck |
| 5,083,857 A | 1/1992 | Hornbeck |
| 5,202,785 A | 4/1993 | Nelson |
| 5,233,456 A | 8/1993 | Nelson |
| 5,280,277 A | 1/1994 | Hornbeck |
| 5,565,671 A | 10/1996 | Kirkeby et al. |
| 5,739,941 A | 4/1998 | Knipe et al. |
| 5,808,780 A | 9/1998 | McDonald |
| 5,835,256 A | 11/1998 | Huibers |
| 6,046,840 A | 4/2000 | Huibers |
| 6,172,797 B1 | 1/2001 | Huibers |
| 6,356,378 B1 | 3/2002 | Huibers |
| 6,538,800 B2 | 3/2003 | Huibers |
| 6,690,502 B2 | 2/2004 | Huibers |
| 6,798,561 B2 | 9/2004 | Huibers |
| 6,804,039 B1 | 10/2004 | Doan et al. |
| 6,849,471 B2 | 2/2005 | Patel et al. |
| 6,947,200 B2 | 9/2005 | Huibers |
| 6,950,223 B2 | 9/2005 | Huibers et al. |
| 7,138,693 B2 | 11/2006 | Patel et al. |
| 2002/0047172 A1 | 4/2002 | Reid |
| 2005/0147750 A1 | 7/2005 | Jacobs et al. |
| 2007/0138582 A1* | 6/2007 | Nystrom et al. .............. 257/416 |

* cited by examiner

*Primary Examiner* — Euncha P Cherry
(74) *Attorney, Agent, or Firm* — Charles A. Brill; Wade James Brady, III; Frederick J. Telecky, Jr.

(57) ABSTRACT

A deformable hinge for use in microelectromechanical devices comprises a protection layer that is electrically conductive. The protection layer is on top of another hinge layer; and is more resistive than the hinge layer to the etchant used in during patterning and/or release processes during fabrication of the microelectromechanical device. As a result, the hinge layer can be protected from being damaged during the fabrication process.

24 Claims, 6 Drawing Sheets

ELECTRICALLY CONDUCTIVE PROTECTION LAYER AND A MICROELECTROMECHANICAL DEVICE USING THE SAME

TECHNICAL FIELD OF THE DISCLOSURE

The technical field of this disclosure relates to the art of microelectromechanical devices, and more particularly to the art of electrically conductive layers used as protection layers for protecting parts of microelectromechanical devices.

BACKGROUND OF THE DISCLOSURE

Microelectromechanical devices (MEMS) integrate electrical and mechanical elements through microfabrication technologies. Most of the current MEMS devices comprise device members that are expected to be electrically connected and mechanically and/or electrically stable. However, the electrical connection may not always be guaranteed due to a variety of reasons, such as erosion from etching and/or patterning processes during fabrication.

Micromirror devices are one type of microelectromechanical devices. A typical micromirror device, such as a device for use in spatial light modulators or in optical signal switches, has a deformable hinge (e.g. a torsion hinge) to which a reflective mirror plate is attached. The deformable hinge and the mirror plate are held relative to a substrate such that the deformable hinge is capable of being deformed; and the mirror plate is capable of being rotated. The rotation states of the mirror plate define the operation states (e.g. ON and OFF states) of the micromirror device.

Rotation of the mirror plate can be controlled through an electrostatic field established between the mirror plate and the addressing electrode disposed proximate to the mirror plate. Such electrostatic field causes an electrostatic torque to the mirror plate; and the electrostatic torque moves the mirror plate in the desired direction. To enable the establishment of the electrostatic field, the mirror plate needs to be electrically connected to the external sources (e.g. electrical voltages). An approach to connect the mirror plate to external sources is to electrically connect the mirror plate to the deformable hinge and deliver external signals from the external source to the mirror plate through the deformable hinge. In this approach, the deformable hinge comprises an electrically conductive layer that is electrically connected to the mirror plate. Because of the active chemical properties of many electrically conductive materials, the electrically conductive hinge layer may have an oxide layer formed thereon during or after the fabrication process. The formed oxide layer can significantly reduce the performance of the conductive hinge layer, which in turn, reduces the performance of the hinge.

As an example, $TiAl_x$ is often used as an electrically conductive hinge layer of a micromirror device. The $TiAl_x$ hinge layer may have formed thereon a non-conductive oxide layer during fabrication. Such oxide layer may produce organometallic materials when exposed to photo processing, such as patterning using a photoresist material. The produced oxide layer and/or the organometallic materials, as well as other possible contaminates may not have been removed during etching or cleaning of the micromirror device. As a consequence, these materials are left with other device members of the micromirror device after releasing.

Therefore, it is desired to protect the electrically conductive layer of a MEMS device, while maintaining the desired electrical conductivity between particular device members of the MEMS device.

SUMMARY

In view of the foregoing, disclosed herein is an electrically conductive layer used for protecting device members of MEMS devices.

In one example, a micromirror device is provided. The device comprises: a substrate having formed thereon an electric circuit and an addressing electrode; a deformable hinge held above the substrate such that the deformable hinge is capable of being deformed, wherein the deformable hinge comprises: a first hinge layer that is electrically conductive; and a second hinge layer on top of the first hinge layer that is electrically conductive, wherein the second hinge layer is more resistant to an etching process than the first hinge layer, and wherein the etching process is an process used for patterning the first hinge layer; and a mirror plate above the deformable hinge and electrically connected to the deformable hinge such that the mirror plate is capable of moving above the substrate.

In another example, a micromirror device is disclosed herein. The device comprises: a substrate having an electrode and a hinge connection pad formed thereon; a deformable hinge held above the substrate, comprising: an intermediate hinge layer laminated between a top and a bottom hinge layer, wherein the top and the bottom hinge layers comprise an electrically conductive material that is different from the material of the intermediate hinge layer; a mirror plate attached to the deformable hinge such that the mirror plate is capable of moving above the substrate; and wherein the mirror plate is electrically connected to the top hinge layer through a mirror post; and the bottom hinge layer is electrically connected to the hinge connection pad.

In yet another example, a method of making a micromirror device is provided. The method comprises: providing a substrate having formed thereon an electrical circuit; depositing and patterning a first sacrificial layer on the substrate; forming a deformable hinge on the first sacrificial layer, comprising: depositing a bottom hinge layer on the first sacrificial layer; depositing an intermediate hinge layer on the bottom hinge layer; depositing a top hinge layer on the intermediate hinge layer; patterning the bottom, the intermediate, and the top hinge layers so as to form the deformable hinge; depositing a second sacrificial layer on the top hinge layer; forming a mirror plate on the second sacrificial layer; and removing the first and the second sacrificial layers so as to release the micromirror device.

BRIEF DESCRIPTION OF DRAWINGS

FIG. 2 schematically illustrates a cross-section of an exemplary deformable hinge that can be used in the micromirror device illustrated in FIG. 1a;

DETAILED DESCRIPTION OF SELECTED EXAMPLES

In the following, the electrically conductive layer capable of being used for protecting device members or parts of a MEMS device will be discussed with particular examples wherein the MEMS device is a micromirror device. However, it will be appreciated by those skilled in the art that the following discussion is for demonstration purposes, and should not be interpreted as a limitation. Many other variations within the scope of this disclosure are also applicable. For example, the electrically conductive protection layer can also be used in many other MEMS devices than micromirror devices.

Figure 1A:
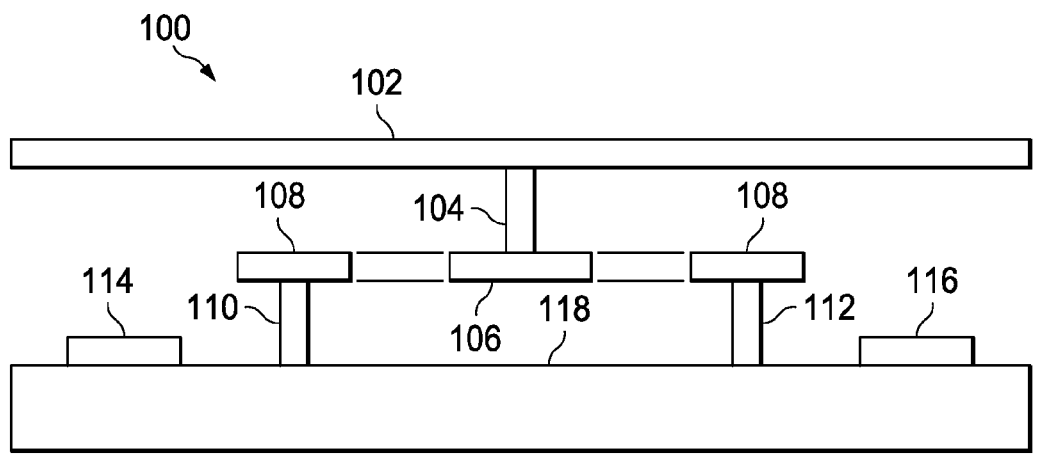
FIG. 1a schematically illustrates a cross-section of an exemplary micromirror device having a deformable hinge, in which examples of this disclosure can be implemented.

Referring to the drawings, FIG. 1a schematically illustrates a cross-sectional view of an exemplary micromirror device having a deformable hinge. In this example, micromirror device 100 comprises mirror plate 102 that comprises a reflective surface capable of reflecting incident light, such as visible light. The mirror plate is attached to deformable hinge 106 through mirror post 104. The deformable hinge (106) in this example is a torsional hinge, and can be another type of deformable hinge in other examples. The deformable hinge (106) is held by hinge arm 108. The hinge arm is held above substrate 118 by hinge posts 110 and 112 such that the deformable hinge can deform; and the mirror plate can rotate above the substrate. Substrate 118 in this example is a semiconductor substrate (e.g. a Si substrate) having formed thereon a circuit, such as a memory, for controlling voltages applied to the addressing electrodes (116 and 114).

Figure 1B:
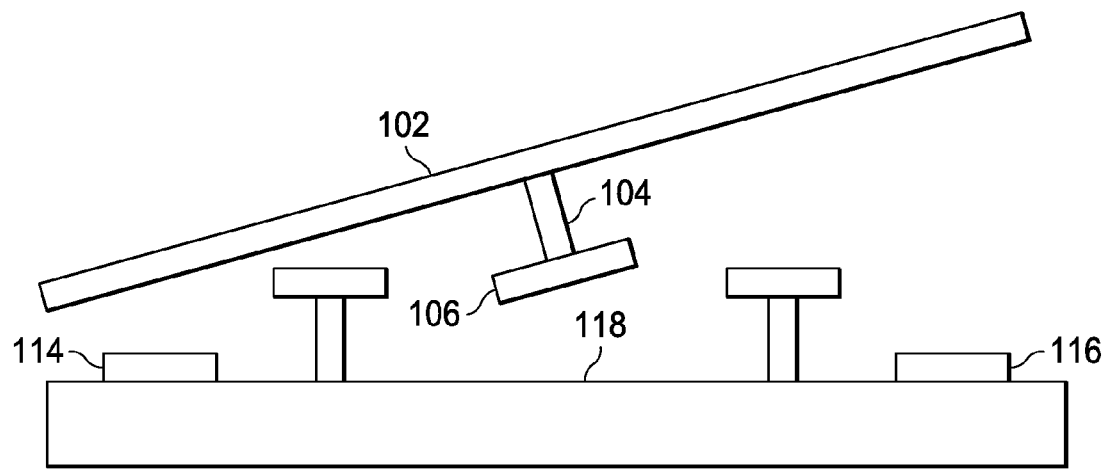
FIG. 1b schematically illustrates the micromirror in FIG. 1a wherein the deformable hinge is deformed when the mirror plate is rotated.

Rotation of the mirror plate relative to the substrate can be accomplished by using addressing electrodes 114 and 116, each of which is disposed at a location proximate to the mirror plate. Electrostatic fields can be established between the mirror plate and the addressing electrodes for rotating the mirror plate by electrostatic torques derived from the electrostatic fields. When the electrostatic fields between the electrodes and the mirror plate are not balanced, the mirror plate is caused to rotate. As an example, when the electrostatic field between electrode 114 and one end of the mirror plate has amplitude larger than that between electrode 116 and the opposite end of mirror plate 116, the mirror plate rotates counter-clockwise towards electrode 114, as schematically illustrated in FIG. 1b. As the mirror plate rotates, the deformable hinge (106) is mechanically deformed, which enables rotation of the mirror plate attached thereto.

In this example, the mirror plate (102) is electrically connected to the deformable hinge (106) through the mirror post 104; and the deformable hinge is electrically connected to a contact pad (not shown in the figure for simplicity) formed on substrate 118. For securing the electrical connection of the deformable hinge (106) to other device members (e.g. mirror plate, hinge arms, and/or hinge posts) and preventing such connection from erosion during fabrication, the deformable hinge comprises an electrically conductive protection layer, an example of which is schematically illustrated in FIG. 2.

Figure 2:
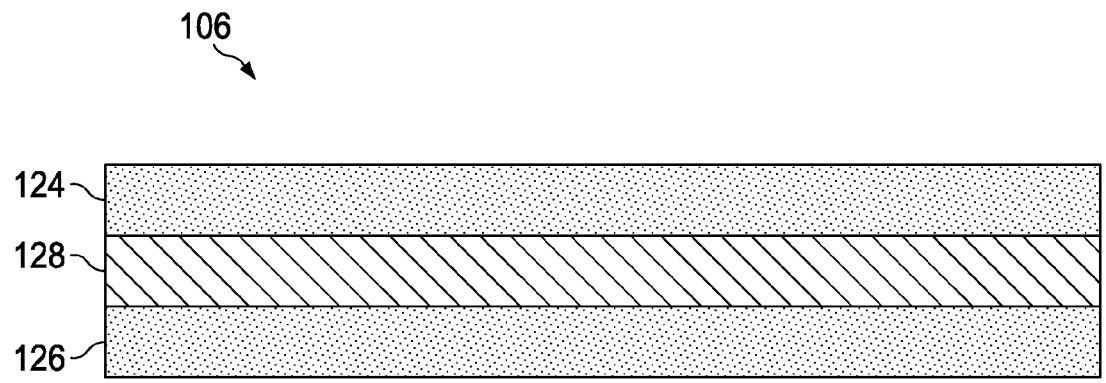

Referring to FIG. 2, an exploded cross-sectional view of a portion of the deformable hinge (106) is schematically illustrated therein. In this example, deformable hinge 106 comprises conductive hinge layer 128 that is laminated between the top and bottom protection layers 124 and 126. The top and/or the bottom layers 124 and 126 are also electrically conductive and are more resistive to the etching processes, such as etching processes during the patterning of the hinge layer (and other device layers) and/or the etching process for removing the sacrificial layers during the releasing process.

In one example, the the top and/or the bottom layers 124 and 126 are electrically conductive and are more resistive to the etching process that is performed during the patterning of the hinge layer. The hinge layer can be etched for patterning using one or more suitable etchants depending upon the specific material of the hinge layer. For example, the hinge layer can be etched with a chlorine chemistry or a fluorine chemistry where the etchant is a perfluorocarbon or hydro fluorocarbon (or $SF_6$). The etchant(s) can be energized so as to selectively etch the hinge layer both chemically and physically (e.g. a plasma/RIE etch with $CF_4$, $CHF_3$, $C_3F_8$, $CH_2F_2$, $C_2F_6$, $SF_6$, etc. or more likely combinations of the above or with additional gases, such as $CF_4/H_2$, $SF_6/Cl_2$, or gases using more than one etching species such as $CF_2Cl_2$, all possibly with one or more optional inert diluents). In examples of a hinge layer comprising multiple layers, different etchants and/or etching processes can be used for etching each layer of the hinge layer (e.g. chlorine chemistry for a metal layer, hydrocarbon or fluorocarbon (or $SF_6$) plasma for silicon or silicon compound layers, etc.). Regardless of different etchants and/or etching processes for etching the hinge layer, it is preferred that the protective layer is more resistant to the etchant(s) and the etching process(s) than the hinge layer.

It is noted that depending upon the specific method for making the device, the protective layers can be formed in different ways and in different stages of the fabrication process. In one example, the protective layer can be deposited using a reactive sputtering, preferably (though nor required) with a low sputtering rate and low sputtering power, and more preferably without RF (Radio Frequency) power. For example, a $TiN_x$ protective layer can be deposited with a DC magnetron sputtering in the absence of RF power. The deposited protective layer can then be patterned by etching using a method as discussed above.

The protective layer(s) can be formed during the process of making the deformable element having the deformable layer, or can be formed after the deformable element or the MEMS device has been fabricated. In one example, the protective layer can be formed after patterning the hinge layer, such as by depositing a protective layer on the patterned hinge layer followed by patterning the protective layer using a suitable etchant.

In the example wherein both of the top and the bottom hinge layers are to be protected by protective layers, the first protective layer can be formed before forming the hinge layer. The hinge layer can be formed on the first protective layer such that the bottom surface of the hinge layer can be protected by the first protective layer. After forming the hinge layer, the second protective layer can be formed on the hinge layer so as to protect the top surface of the hinge layer.

In another example, the hinge layer can be formed. After releasing the hinge layer by removing the sacrificial layer, the protective layer(s) can be formed on the surfaces (e.g. the top and the bottom surfaces) of the hinge by depositing the protective layer(s) using, for example, sputtering. Of course, other suitable methods can be employed to form the protective layer(s).

In one example, the protection layers 124 and 128 each have an etching rate (during at least one of patterning and or release) that is 1/2 or less than the etching rate of the conductive hinge layer (128) to the etching process(es) used during the fabrication. The etching rate of each one of the protection layers 124 and 126 can be 1/10 or less, 1/20 or less, 1/50 or less, or 1/100 or less than the etching rate of the conductive hinge layer (128).

Hinge layer 128 is an electrically conductive layer; and can comprise any suitable materials, such as single metal, metal-compounds, metal-alloys, electronically conductive ceramics, and many other suitable materials. In one example, hinge layer 128 is a layer of TiAl$_x$ with a thickness from 200 angstroms to 1000 angstroms, such as from 300 angstroms to 600 angstroms. Hinge layer 128 can be formed with any other suitable thicknesses. It is appreciated by those skilled in the art that the hinge layer 128 as illustrated in FIG. 2 is for demonstration purposes. Many other variations are also applicable. For example, hinge layer 128 can be a multi-layered hinge structure that comprises at least one metallic hinge layer; and other hinge layers that may or may not be electrically conductive. The hinge layers of the multi-layered hinge structure can be laminated together to form a hinge laminate.

Without the protection layers (124 and 126), hinge layer 128 may suffer from oxidation and have an oxide layer at surface(s) exposed to the fabrication environment, especially to etching processes during the fabrication. The formed oxide layer may further be developed into organometallic layers residing at the exposed surface(s) of hinge layer 128. These oxide layers and organometallic layers may not be removed by etching during the fabrication; and exhibit poor electrical conductivities (e.g. less than the desired conductivity in the deformable hinge). As a consequence, desired electrical connections between the deformable hinge and other device members, such as the mirror plate, are degraded or even damaged, which may cause device failure. Moreover, the desired mechanical property of the deformable hinge can be changed, or is subject to uncontrollable variation due to the formed oxide layers and organometallic layers on the surface(s) of the deformable hinge.

With the protection layers, the hinge layer (128) is substantially protected from being exposed to the etching processes or other processes that may chemically, physically, or chemiphysically vary the electrical and/or mechanical properties of the hinge layer (128) through, for example, chemical, physical, or physical-chemical reactions to the hinge layer (128).

The conductive protection layers 124 and 126 can be formed on major surfaces, such as the top and bottom surfaces, of hinge layer 128, as schematically illustrated in FIG. 2 such that substantially all top and bottom surface areas of hinge layer 128 are covered by the protection layers 124 and 126. Alternatively, the protection layers 124 and 126 can be formed such that only the portion of hinge layer 128 exposed during the fabrication is substantially covered by the protection layers.

Because the protection layers 124 and 126 each are electrically conductive, desired electrical connections between the hinge layer 128 to other device members (e.g. the mirror plate) can be accomplished through the protection layer(s). In one example, the desired electrical connection between hinge layer 128 and the mirror plate can be accomplished by connecting protection layer 124 to the mirror plate; while the protection layer (124) is directly connected to the hinge layer (128). The desired electrical connection between the hinge layer (128) and other device members (e.g. contact pad on the substrate of the micromirror device) can be accomplished by electrically connecting protection layer 126 to the contact pad.

The protection layer (124) can comprise any suitable materials, such as single metal, metal alloy, metallic compounds, and selected ceramic that are electrically conductive. However, it is preferred that the protection layer 124 comprises a material that is inert to the following etching processes used for patterning the deposited layers for forming the desired functional members of the micromirror device, and/or the etching process for removing the sacrificial materials deposited during the fabrication. In one example, the protection layer (124) comprises TiN$_x$. In this example, the TiN$_x$ protection layer may have any desired thickness, such as a thickness from 5 to 200 angstroms, from 10 to 100 angstroms, or from 50 to 70 angstroms.

Figure 3:
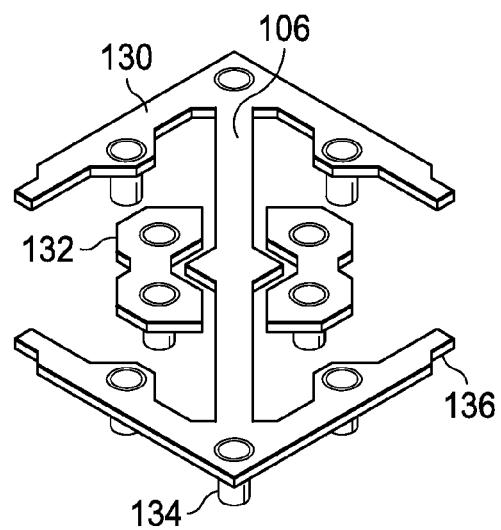
FIG. 3 schematically illustrates a perspective view of an exemplary hinge structure comprising a deformable hinge, wherein the deformable hinge comprises a structure illustrated in FIG. 2.

By way of example, FIG. 3 schematically illustrates an exemplary hinge structure having a deformable hinge as illustrated in FIG. 2. Referring to FIG. 3, the hinge structure in this example comprises deformable hinge 106, which is a torsion hinge. The deformable hinge (106) takes a configuration as discussed above with reference to FIG. 2.

The deformable hinge (106) is attached to a hinge arm (130) that holds the deformable hinge. The hinge arms (e.g. 130) correspond to the hinge arms (e.g. 108) in FIG. 1a. The deformable hinge and the hinge arm can be formed substantially in the same plane, which is referred to as the hinge plane. Other feature can be formed in the hinge plane, such as electrode 132 for deflecting the mirror plate attached to the deformable hinge and stopping mechanism 136. The stopping mechanism, which is a spring tip in this example, can be provided for stopping the movement of the mirror plate when the mirror plate is at desired positions, such as the rotational positions corresponding to the ON and OFF states of the micromirror. The hinge arm can be supported by hinge posts, such as hinge post 134, above a substrate such that the deformable hinge can deform; and the mirror plate can rotate relative to the substrate.

Figure 4:
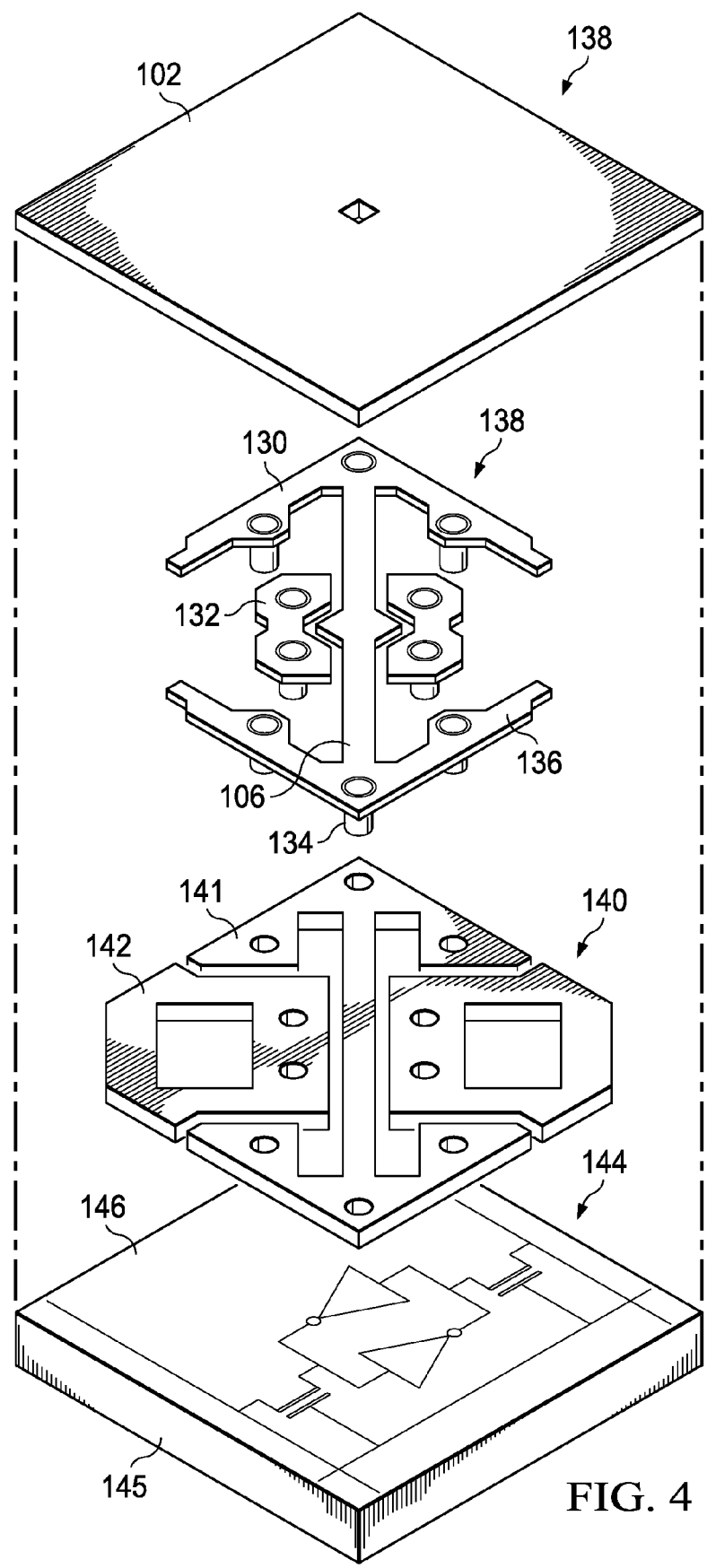
FIG. 4 schematically illustrates an exemplary micromirror device having a hinge structure illustrated in FIG. 3.

An exemplary micromirror device having a deformable hinge as illustrated in FIG. 3 is schematically illustrated in FIG. 4. Referring to FIG. 4, the micromirror device in this example comprises substrate portion 144 wherein substrate 145 is provided. The substrate (145) can be a semiconductor substrate on which standard electronic circuits can be formed. For example, substrate 145 is a silicon substrate. In other examples, the substrate 145 can comprise other suitable materials, such as single crystal materials.

The substrate (145) comprises an electronic circuit (146) that is provided for controlling electronic signals (e.g. voltages) applied to the addressing electrodes and the mirror plate.

Formed on the substrate portion 144 is an electrode pad portion (140). The electrode portion comprises addressing electrodes, such as addressing electrode 142, on which electronic signals can be applied for deflecting the mirror plate. For this purpose, the addressing electrode(s) is electronically connected to the electric circuit of substrate 145. The electrode portion (140) may comprise hinge connection pad 141. The hinge connection pad 141 can be used for electrically connecting the deformable hinge (106) to the contact pads and/or electronic circuits on substrate 145.

Hinge portion 138 is formed on electrode portion 140 as illustrated in the figure. The hinge portion (138) can be the same hinge portion as discussed above with reference to FIG. 4. Specifically, the hinge portion comprises deformable hinge 106 having a structure as discussed above with reference to FIG. 3. The deformable hinge is held by and electrically connected to hinge arm 130. The hinge arm (130) is electronically connected to hinge connection pad 141 through hinge post 134. Because the hinge connection pad can be configured to be electronically connected to the electronic circuits and/or contact pads on substrate 145, the deformable hinge (106) can thus be electronically connected to the hinge connection pad 141, the electronic circuit on the substrate, and/or the contact pads on the substrate.

The addressing electrodes (132) on the same plane as the deformable hinge can be electrically connected to the addressing electrode pad (142) that is located on the portion of 140 through other hinge posts, as illustrated in FIG. 4.

The reflective mirror plate 102 of the mirror portion (138) is formed on a separate plane above the plane of the deformable hinge (106). The mirror plate is attached and electrically connected to the deformable hinge (106) through a mirror post such that the reflective mirror plate is capable of rotating above substrate 145. Rotation of the mirror plate is enabled and controlled by electrodes 132 and 142 through electrostatic fields established between the mirror plate and the electrodes. Electronic signals, such as electronic voltages can be applied to the mirror plate through the electrical connection between the mirror plate and the deformable hinge (through the mirror post), the deformable hinge, and the electrical connection between the deformable hinge and the hinge connection pad (142).

The electrical connectivity of the deformable hinge to the mirror plate or other functional members, such as the hinge arm and hinge post can be characterized by the resistivity and equivalently, the voltage established across the deformable hinge. For demonstration purpose, FIG. 5*a* presents voltages established across a deformable hinges of different micromirror devices, wherein the deformable hinges have substantially the same structure as discussed above with reference to FIG. 3 and FIG. 4.

Figure 5A:
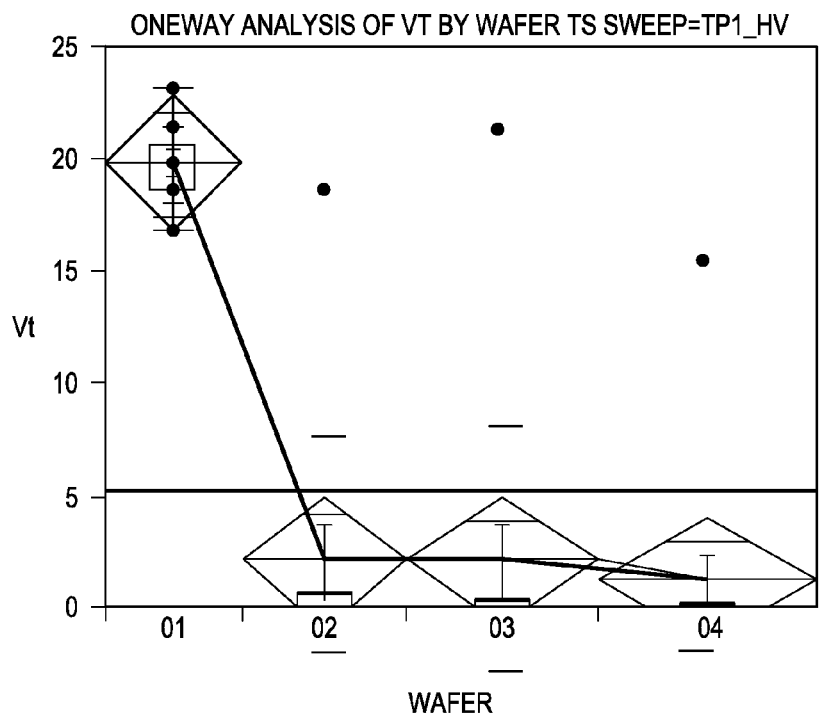
FIG. 5a shows a diagram demonstrating the voltage established across the deformable hinge in the micromirror device of FIG. 4

Referring to FIG. 5*a*, micromirror devices having their deformable hinge fabricated in different ways are plotted in the horizontal axis. Specifically, "wafer 01" represents a wafer having an array of micromirror devices each having a deformable hinge as discussed above with reference to FIG. 3 and FIG. 4. The deformable hinges of the micromirror devices are fabricated by a non-in-situ method; while the deformable hinges of the micromirrors in "wafer 02," "wafer 03," and "wafer 04" are fabricated by in-situ depositions. It can be seen in FIG. 5*a* that voltage $V_t$ across the deformable hinge of the micromirror in "wafer 01" is about10 times higher than the voltages across the deformable hinges of micromirror devices in other wafers wherein the deformable hinges are fabricated by in-situ depositions. Higher voltages across the deformable hinges indicate higher resistances of the deformable hinges; and the resistances of the deformable hinges can be characterized by resistivity that is independent from the geometric configurations of the deformable hinges. The resistivity derived from the voltages across the deformable hinges as illustrated in FIG. 5*a* is schematically illustrated in FIG. 5*b*.

Figure 5B:
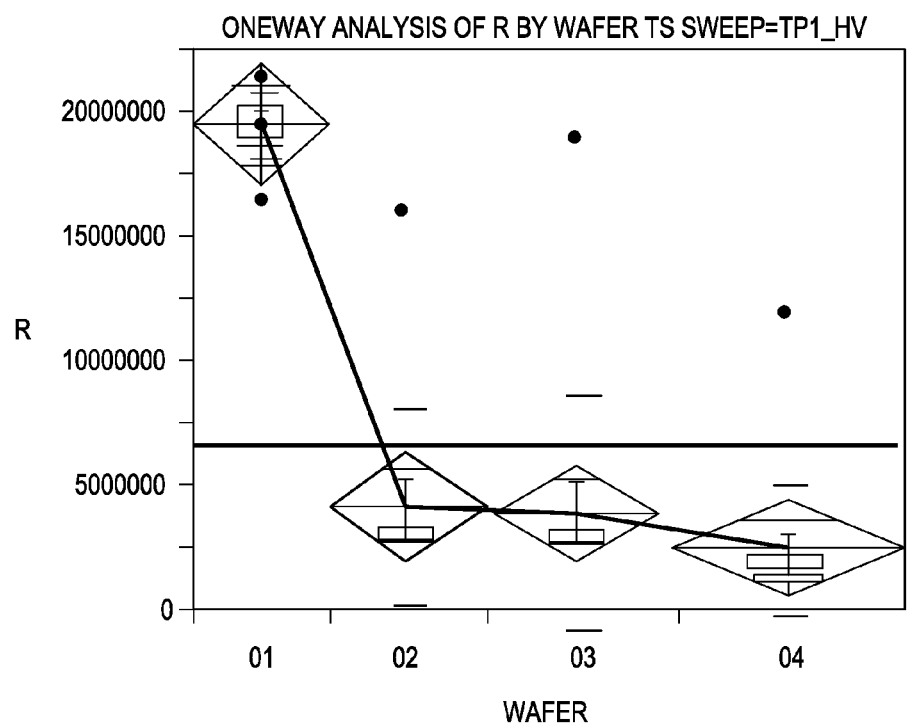
FIG. 5b shows a diagram demonstrating the resistivity of the deformable hinge in the micromirror device of FIG. 4.

Referring to FIG. 5*b*, the deformable hinges of the micromirror devices in "wafer 01" is around 10 times larger than the resistivity of the deformable hinges of micromirror devices in "wafer 02," "wafer 03," and "wafer 04."

From the above examples as illustrated in FIG. 5*a* and FIG. 5*b*, it can be seen that the deformable hinges fabricated using in-situ deposition during fabrication have lower resistivity, which indicates higher electrical conductivities. Therefore, it is preferred to fabricate deformable hinges of micromirror devices by in-situ depositions in favor of high electrical conductivity or connections between the deformable hinges and other functional members of the micromirror devices.

The deformable hinge and micromirror devices having the deformable hinge as discussed above can be fabricated in many ways. For demonstration purpose, FIG. 6*a* through FIG. 6*f* schematically illustrate an exemplary method of fabricating a micromirror device illustrated in FIG. 4. The cross-sectional views in FIG. 6*a* through FIG. 6*f* are taken along a plane perpendicular to the plane of the deformable hinge and passing through the central axis of the deformable hinge 106 in FIG. 4

Figure 6A:
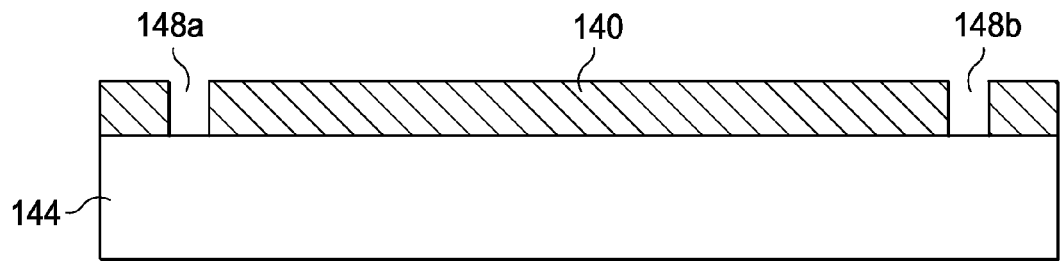
FIG. 6a through FIG. 6f schematically illustrate an exemplary method of fabricating the micromirror device in FIG. 4.

Referring to FIG. 6*a*, substrate portion 144 is provided. Substrate portion 144 can comprise a semiconductor substrate (e.g. semiconductor substrate 15) and an electronic circuit (e.g. circuit 146) formed thereon as discussed above with reference to FIG. 4. The electronic circuit can be fabricated on the semiconductor substrate using many suitable ways, such as a standard integrated circuit fabrication method. The substrate can have other desired features formed thereon, such as electronic contact pads through which external signals can be delivered to the members of the micromirror device.

Electrode layer 140 is deposited on substrate portion 144 for forming the electrode portion (e.g. 140 in FIG. 4). The electrode layer (140) comprises a selected material, such as a metallic material. The deposited electrode layer is then patterned so as to form the desired features, such as addressing electrode 142 and the hinge connection pad (141) in FIG. 4. Other features, such as posts areas 148*a* and 148*b* can also be formed. Post areas 148*a* and 148*b* can be used for electrically connecting the deformable hinge and other desired functional members to the electrical circuits on the substrate portion.

The electrode layer can be deposited by any suitable methods, such as a chemical vapor deposition, plasma-enhanced-chemical-vapor deposition, and many other suitable deposition methods used in standard thin-film fabrications. Patterning of the deposited electrode layer (140) can be performed by any suitable methods and by using any suitable etchants, such as a standard thin film etching method with a photoresist material. Other patterning methods are also applicable.

Figure 6B:
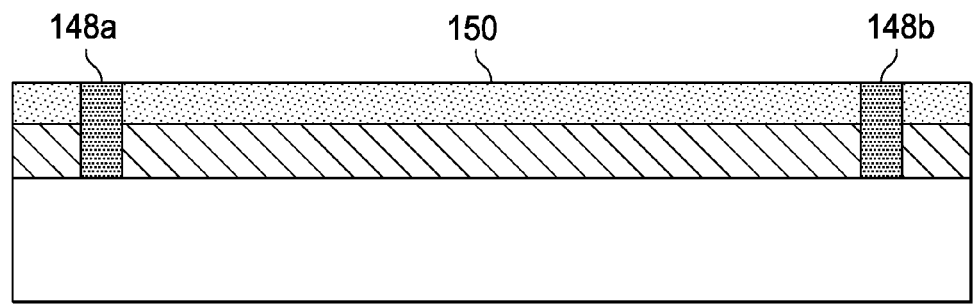

After patterning the electrode layer, a sacrificial layer (150) comprising a selected sacrificial material, such as a dielectric material (e.g. polysilicon and amorphous silicon) can be deposited on the patterned electrode layer (140). The sacrificial layer can then be patterned as schematically illustrated in FIG. 6*b*. The sacrificial layer can be deposited and patterned by using a standard thin film deposition method.

Figure 6C:
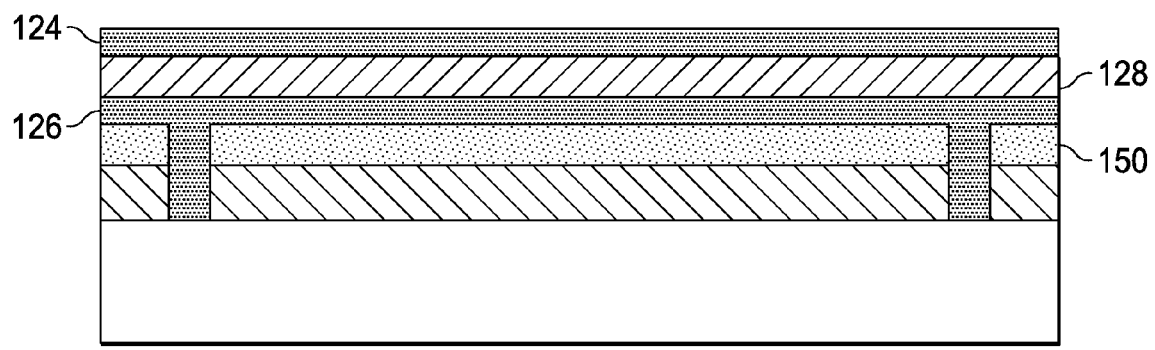

After patterning the sacrificial layer (150), the desired hinge structure (e.g. hinge structure 106) as discussed above with reference to FIG. 2, FIG. 3, and FIG. 4 can be formed. Specifically, hinge layers 126, 128, and 124 can be deposited, preferably by in-situ deposition, on the sacrificial layer (150) as schematically illustrated in FIG. 6*c*. The hinge layers 126, 128, and 124 can then be patterned so as to form the desired hinge structures, such as hinge arm 130, stopping mechanism 136, and electrode 132. It is noted that the individual hinge layers of the hinge structure can be deposited followed by patterning individually, or can be deposited individually and then patterned through single patterning process. In depositing hinge layers of the deformable hinge, the first deposited hinge layer, such as hinge layer 126 fills the post areas 148*a* and 148*b* as schematically illustrated in FIG. 6*c*.

Figure 6D:
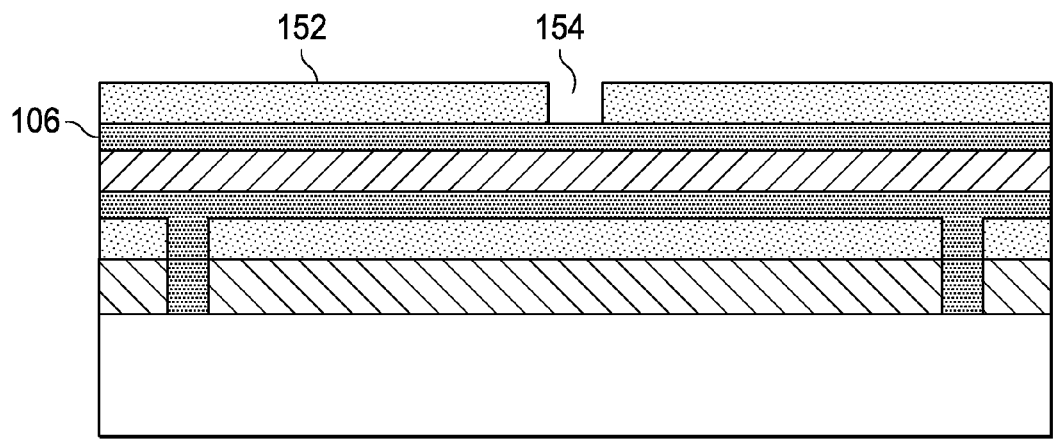

On the patterned and formed hinge structure (106), another sacrificial layer (152) can be deposited as schematically illustrated in FIG. 6*d*. The sacrificial layer 152 can then be patterned so as form via 154 wherein a mirror-post can be formed.

Figure 6E:
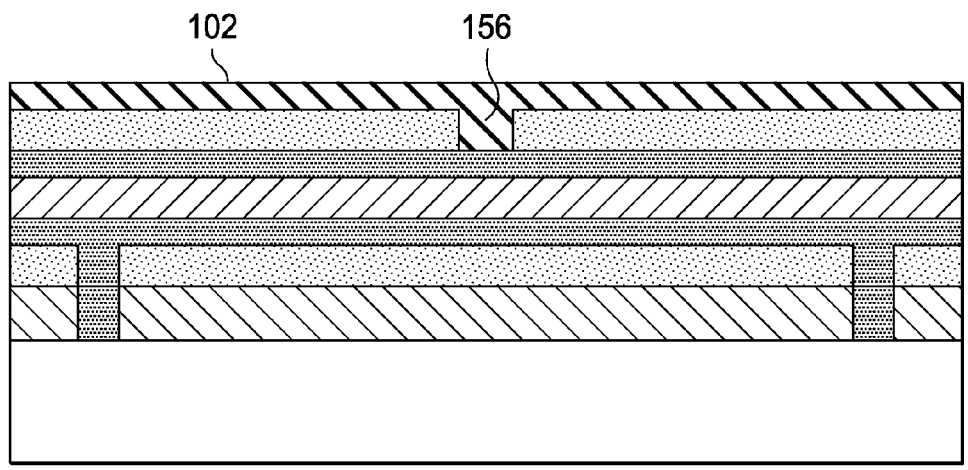

On the patterned sacrificial layer 152, via 154 can be filled with a selected material so as to form the desired mirror post (156) as schematically illustrated in FIG. 6*e*. The mirror post preferably comprises an electrically conductive material so as to electrically connecting the mirror plate, which will be formed afterwards, to the deformable hinge.

A mirror plate layer can be deposited followed by patterning on the sacrificial layer (152) so as to form the desired mirror plate (102) as schematically illustrated in FIG. 6e. The mirror plate is formed such that at least one of the electrically conductive mirror plate layer is electrically connected to the mirror post (156). It is noted that the mirror plate may comprise multiple layers. In one example, the mirror plate comprises an electrically conductive layer at the bottom for electrically contacting to the mirror post and the deformable hinge. The mirror plate can further comprise a mechanically enhancing layer, such as a dielectric layer, laminated between the bottom electrically conducting layer and a top reflective layer. The top reflective layer of the mirror plate can comprise any suitable materials such that the reflective top mirror plate layer is reflective to the incident light, such as the visible light. The mirror plate may comprise other desired mirror plate layers.

After forming all desired functional members of the micromirror device, such as those functional members as discussed above with reference to FIG. 4, the sacrificial layers 150 and 152 can be removed using a suitable etching method with a selected etchant. For example, the sacrificial layers can be removed by solvents for removing organic sacrificial materials, or a non-energized vapor phase etching using a spontaneous vapor phase etchant, such as an interhalogen or a noble gas halide or HF, among others.

Figure 6F:
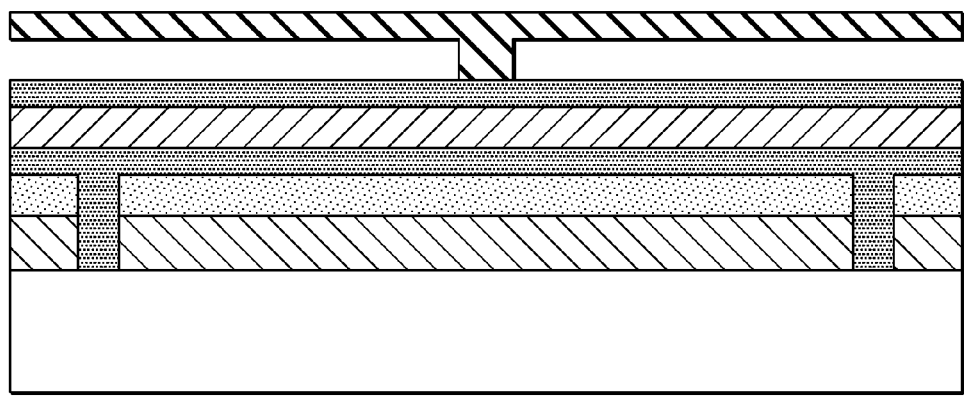

The released micromirror device after removing the sacrificial layers is schematically illustrated in FIG. 6f.

It will be appreciated by those of skill in the art that a new and useful deformable hinge and a micromirror device having the deformable hinge have been described herein. In view of the many possible embodiments, however, it should be recognized that the embodiments described herein with respect to the drawing figures are meant to be illustrative only and should not be taken as limiting the scope of what is claimed. Those of skill in the art will recognize that the illustrated embodiments can be modified in arrangement and detail. Therefore, the devices and methods as described herein contemplate all such embodiments as may come within the scope of the following claims and equivalents thereof.

The invention claimed is:

1. A method of making a micromirror device, comprising:
providing a substrate having an electrode formed thereon;
forming a sacrificial layer comprising a sacrificial material on the substrate;
forming a deformable hinge on the sacrificial layer;
forming a protective layer on a surface of the deformable hinge, wherein the protective layer is electrically conductive;
forming a second sacrificial layer on the deformable hinge;
forming a mirror plate on the second sacrificial layer;
performing an etching process using an etchant to remove the first and the second sacrificial layers, wherein the protective layer is more resistant to the etching process than the deformable hinge.

2. The method of claim 1, wherein the etchant is a fluorine chemical compound or a chlorine chemical compound.

3. The method of claim 2, wherein the protective layer comprises $TiN_x$; wherein the deformable hinge comprises $Ti_xAl_y$.

4. The method of claim 2, further comprising:
before forming the deformable hinge on the first sacrificial layer, forming another protective layer on the first sacrificial layer; and
wherein the deformable hinge is formed on said another protective layer.

5. The method of claim 4, further comprising:
depositing said another protective layer;
depositing a layer of said deformable hinge;
patterning said layer of the deformable hinge by an etching process using an etchant, wherein said etchant and the etching process is substantially incapable of etching said another protective layer.

6. The method of claim 5, wherein said another protective layer is patterned prior to or after the step of patterning said layer of the deformable hinge.

7. The method of claim 1, wherein the step of forming a protective layer on a surface of the deformable hinge is performed after the step of performing an etching process using an etchant to remove the first and the second sacrificial layers.

8. The method of claim 7, further comprising:
forming another protective layer on a surface of the released deformable hinge by sputtering.

9. The method of claim 8, wherein said another protective layer comprises $TiN_x$; and wherein the deformable hinge comprises $Ti_xAl_y$.

10. The method of claim 1, wherein the deformable hinge is a torsion hinge that is capable of deforming after the first and second sacrificial layers being removed.

11. The method of 10, wherein the protective layer is formed on a top surface of the deformable hinge; and said another protective layer is formed on a bottom surface of the deformable hinge; and wherein the protective layer is electrically connected to the mirror plate; and said another protective layer is electrically connected to the electrode on the substrate.

12. A micromirror device, comprising:
a substrate having an electrode and a hinge connection pad formed thereon;
a deformable hinge held above the substrate, comprising:
an intermediate hinge layer laminated between a top and a bottom hinge layer, wherein the top and the bottom hinge layers comprise an electrically conductive material that is different from the material of the intermediate hinge layer;
a mirror plate attached to the deformable hinge such that the mirror plate is capable of moving above the substrate; and
wherein the mirror plate is electrically connected to the top hinge layer through a mirror post; and the bottom hinge layer is electrically connected to the hinge connection pad.

13. The device of claim 12, wherein the top and the bottom hinge layers are $TiN_x$ layers.

14. The device of claim 13, wherein the intermediate hinge layer is a $TiAl_x$ layer.

15. The device of claim 13, wherein the top and bottom hinge layers each are more resistant to an etching process that is applied for patterning the intermediate hinge layer.

16. The device of claim 15, wherein the top and the bottom hinge layers each have an etching rate that is 1/20th or less than the etching rate of the intermediate hinge layer to the etching process.

17. A method of making a micromirror device, the method comprising:
providing a substrate having formed thereon an electrical circuit;
depositing and patterning a first sacrificial layer on the substrate;
forming a deformable hinge on the first sacrificial layer, comprising:

depositing a bottom hinge layer on the first sacrificial layer;

depositing an intermediate hinge layer on the bottom hinge layer;

depositing a top hinge layer on the intermediate hinge layer;

patterning the bottom, the intermediate, and the top hinge layers, together or separately, so as to form the deformable hinge;

depositing a second sacrificial layer on the patterned deformable hinge;

forming a mirror plate on the second sacrificial layer; and removing the first and the second sacrificial layers so as to release the micromirror device.

18. The method of claim 17, wherein the top, the intermediate, and the bottom hinge layers are laminated such that the top and the bottom surfaces of the intermediate hinge layer are substantially fully covered by the top and the bottom hinge layers.

19. The method of claim 18, wherein the top or the bottom hinge layers are deposited by an in-situ deposition process.

20. The method of claim 19, wherein the top and the bottom hinge layers are electrically conductive.

21. The method of claim 20, wherein the intermediate hinge layer is electrically conductive and comprises a material that is different from a material of the top and the bottom hinge layers.

22. The method of claim 21, wherein the intermediate hinge comprises a material that is more resistant to an etching process applied for patterning the intermediate layer than the top and the bottom hinge layers.

23. The method of claim 22, wherein the top and the bottom layers each comprise a $TiN_x$ material; and the intermediate hinge layer comprises a $TiAl_x$ layer.

24. The method of claim 18, wherein the step of providing the substrate further comprises: forming an electrode and a hinge connection pad on the substrate.

* * * * *